United States Patent [19]

Meyer et al.

[11] Patent Number: 5,386,722
[45] Date of Patent: Feb. 7, 1995

[54] METHOD AND APPARATUS FOR STATISTICALLY DETERMINING KNOCK BORDERLINE AND EVALUATING KNOCK INTENSITY IN AN INTERNAL COMBUSTION ENGINE

[75] Inventors: Daniel L. Meyer, Dearborn; Michael Smokovitz; Patrick A. Kaluzny, both of Canton, all of Mich.

[73] Assignee: Ford Motor Company, Dearborn, Mich.

[21] Appl. No.: 36,574

[22] Filed: Mar. 24, 1993

[51] Int. Cl.6 .................. F02P 5/15; G01L 23/22; G01M 15/00
[52] U.S. Cl. .................................. 73/117.3; 73/115
[58] Field of Search ................. 73/115, 116, 35, 117.3

[56] References Cited

U.S. PATENT DOCUMENTS

| | | | |
|---|---|---|---|
| 4,403,505 | 9/1983 | Hattori et al. | 73/115 |
| 4,744,243 | 5/1988 | Tanaka | 73/117.3 |
| 4,760,733 | 8/1988 | Tanaka | 73/115 |
| 4,800,500 | 1/1989 | Tanaka | 73/115 |
| 4,802,454 | 2/1989 | Tanaka | 73/115 |
| 4,892,075 | 1/1990 | Iriyama et al. | 73/115 |
| 4,993,387 | 2/1991 | Sakakibara et al. | 123/425 |
| 5,020,360 | 6/1991 | Brosi et al. | 73/115 |
| 5,040,510 | 8/1991 | Krebs et al. | 123/425 |
| 5,076,098 | 12/1991 | Miwa | 73/115 |
| 5,115,779 | 5/1992 | Itoyama | 123/425 |
| 5,119,783 | 6/1992 | Komurasaki | 73/117.3 |
| 5,127,262 | 7/1992 | Demizu et al. | 73/115 |
| 5,134,980 | 8/1992 | Sakakibara et al. | 123/425 |
| 5,229,945 | 7/1993 | Demizu et al. | 73/115 |

*Primary Examiner*—Herzon E. Williams
*Assistant Examiner*—George M. Dombroske
*Attorney, Agent, or Firm*—Roger L. May; Allan J. Lippa

[57] ABSTRACT

Provided is a method and apparatus for statistically detecting knock borderline and evaluating knock intensity in an internal combustion engine having at least one cylinder.

20 Claims, 4 Drawing Sheets

METHOD AND APPARATUS FOR STATISTICALLY DETERMINING KNOCK BORDERLINE AND EVALUATING KNOCK INTENSITY IN AN INTERNAL COMBUSTION ENGINE

TECHNICAL FIELD

This invention relates generally to a knock control system for detecting a knocking generated in an internal combustion engine and controlling the causative factors including ignition timing and air/fuel ratio. More particularly, this invention relates to a method and apparatus for statistically detecting knock borderline and evaluating knock intensity in an internal combustion engine having at least one cylinder.

BACKGROUND ART

During the last half century, considerable research has been devoted to the development of feedback engine control strategies which incorporate in-cylinder transducers for the measurement of selected values. In recent years, the primary focus of renewed interest has been in the possible development of practical on-board systems, for individual cylinder feedback trimming control of spark timing to MBT (Minimum Spark Advance For Best Torque) or to the knock limit, analogous to EGO (Exhaust Gas Oxygen) sensor feedback trimming control of air/fuel ratio to stoichiometry.

For the most part, prior art implementations have relied strictly on the use of vibration sensors in conjunction with elaborate signal processing to obtain the desired feedback result. See, for example, U.S. Pat. No. 5,040,510 entitled "Method For Controlling Knocking In Internal Combustion Engines," issued to Krebs et al on Aug. 20, 1991 and assigned to Siemens Aktiengesellschaft. See also, U.S. Pat. Nos. 4,993,387 and 5,134,980 issued to Sakakibara et al on Feb. 19, 1991 and Aug. 4, 1992, respectively. Both the '387 and '980 patents are assigned to Nippondenso Co., Ltd. and relate to statistical based knock control systems for engines.

As previously indicated, each of the referenced prior art disclosures utilize vibration sensors to detect structure borne vibrations resulting from combustion chamber acoustic pressure oscillations (produced by knock or detonation). Vibration sensors of the type referenced above have generally proven inadequate as they also detect other structure borne vibrations and usually exhibit poor signal-to-noise ratios—particularly at high engine speeds. Similarly, the elaborate signal processing of the referenced prior art has proven expensive and temperamental and thus not desirable for non-laboratory based use.

SUMMARY OF THE INVENTION

The present invention overcomes the difficulties of prior art control system approaches by providing a method and practical on-board apparatus for detecting knock borderline and evaluating knock intensity in an internal combustion engine having at least one cylinder.

A general object of the present invention is therefore the provision of a knock control system for detecting a knocking generated in an internal combustion engine and controlling the causative factors such as ignition timing and air/fuel ratio.

A more specific object of the present invention is the provision of a method and practical on-board apparatus for detecting knock borderline and evaluating knock intensity in an internal combustion engine having at least one cylinder.

Still further, a more specific object of the present invention is the provision of a statistically based method and microprocessor implementation thereof for detecting knock borderline and evaluating knock intensity in an internal combustion engine.

Another more specific object of the present invention is a method and apparatus for evaluating a collection of determined knock level values in accordance with a selected probability density function to determine selected statistical values of a corresponding statistical distribution, detecting shifts in the determined statistical values and normalizing the determined statistical values to compensate for shifting caused by changes in engine operating conditions.

In accordance with the present invention, the method of detecting knock borderline and evaluating knock intensity in an internal combustion engine comprises the steps of detecting combustion pressure fluctuations in at least one cylinder of the internal combustion engine and generating a plurality of electrical input signals corresponding thereto. Following determination of engine cycle phasing, the input signals are combined into at least one time-division multiplexed (TDM) input channel in accordance with the determined engine cycle phasing. Thereafter, the TDM input channel is filtered over a selected bandwidth to attenuate undesired frequency components and amplify desired frequency components so as to produce a plurality of bandpass filter signals. The amplitude of these bandpass filtered signals is determined in absolute value and thereafter processed over selected intervals of engine cycle phasing to produce a plurality of window interval processed output signals.

These output signals are thereafter combined into at least one time-division multiplexed (TDM) knock level channel to produce a plurality of TDM output signals, each of which correspond in real-time to the knock level values of each and every combustion event in the internal combustion engine. A collection of the knock level values are therefore statistically evaluated in accordance with a selected probability density function to determine selected statistical values of a corresponding statistical distribution. Shifts are then detected in the determined statistical values which are correspondingly normalized to compensate for the shifting caused by changes in engine operating conditions.

Also in accordance with the present invention, there is provided a practical on-board apparatus for detecting knock borderline and evaluating the intensity of knock in an internal combustion engine having at least one cylinder. The disclosed apparatus includes pressure sensing means for detecting combustion pressure fluctuations in at least one of the internal combustion engine cylinders and generating a plurality of pressure signals corresponding thereto.

There is further provided engine sensing means for determining engine cycle phasing and generating a corresponding information signal. First channel means is also provided in electrical contact with the pressure sensing means and engine sensing means for receiving the pressure signals, and information signal, and generating at least one time division multiplexed (TDM) signal corresponding thereto. Filter means is provided in electrical contact with the first channel means for receiving the at least one TDM signal, attenuating selected undesired frequency components and amplifying selected desired frequency components to produce a plurality of bandpass filtered signals.

Still further, there is provided first processing means in electrical contact with the filter means for receiving the plurality of bandpass filtered signals, determining the amplitude thereof in absolute value and processing the determined absolute values over selected intervals of engine cycle phasing to produce a plurality of window interval processed output signals. Second channel means is provided in electrical contact with the first processing means and engine sensing means for receiving and recombining the output signals so as to produce a plurality of time division multiplexed (TDM) output signals, each of which correspond in real-time to the knock level values of each and every combustion event of the internal combustion engine.

Finally, second processing means is provided in electrical contact with the second channel means and engine sensing means for statistically evaluating a collection of knock level values in accordance with a selected probability density function to determine selected statistical values, detect shifts in the determined statistical values and normalize the statistical values to compensate for shifting resulting from changes in engine operating conditions.

BRIEF DESCRIPTION OF THE DRAWINGS

Other objects and advantages of the present invention will become apparent from the following description when taken in conjunction with the accompanying drawings in which.

DETAILED DESCRIPTION OF THE INVENTION

Figure 1:
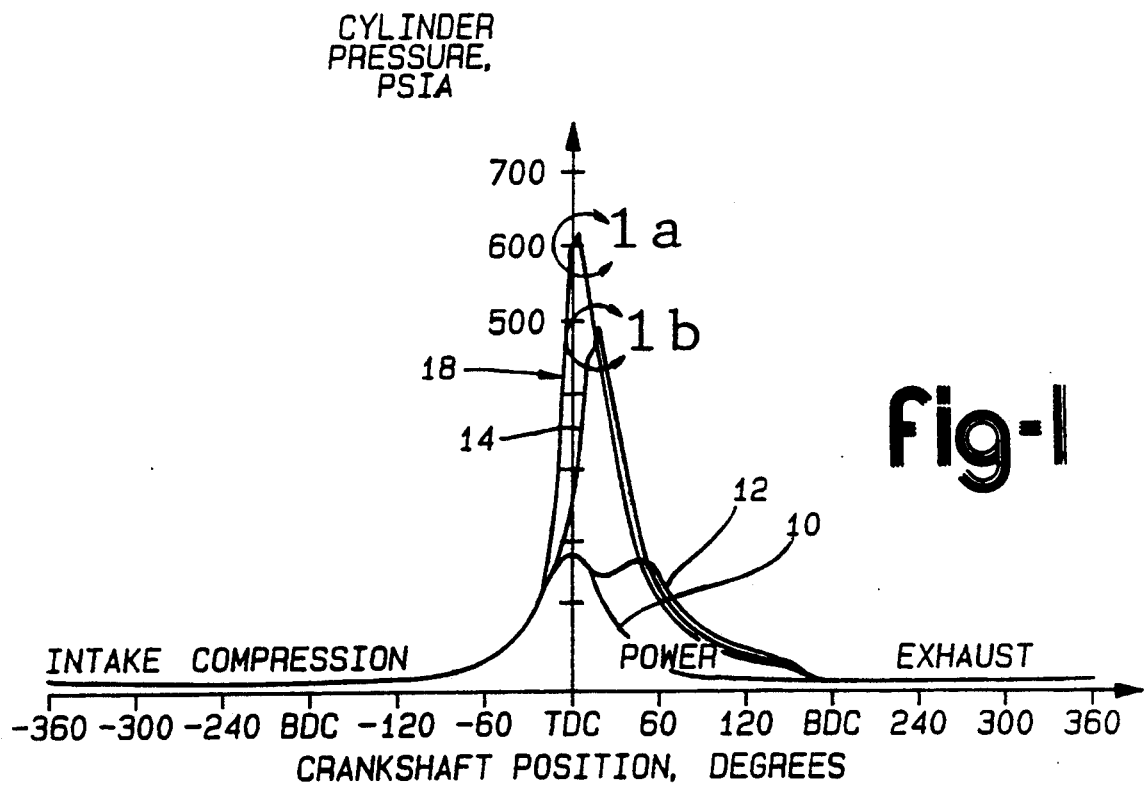
FIGS. 1, 1a and 1b are schematic characterizations of combustion events in an internal combustion engine.

With reference to FIG. 1 of the drawings, those skilled in the art will recognize that the measurement of combustion pressures within the cylinders of an operating internal combustion engine provide information regarding burn rates, work done per cycle, heat release, knock intensity, pre-ignition, and abnormal combustion. The data shown in FIG. 1 represents sample measurements made on one cylinder of a multi-cylinder four-stroke spark-ignited gasoline engine, using a flush mounted piezoelectric combustion pressure transducer (Kistler, Model 6123) and a high resolution crankshaft position encoder.

As seen in FIG. 1, the windows on the engine's intake, compression, power and exhaust strokes are indicated in nominal 180° crank angle increments about top dead center (TDC) of that cylinder's piston motion. The crank angle location for the firing of the spark plug is approximately 20° before TDC. As shown, the cylinder pressure history of a "misfire" is designated generally by reference numeral 10. Those skilled in the art will recognize that this abnormal combustion condition is typically caused by excessive charge dilution, unusually rich air/fuel mixtures, or poor spark ignition system performance. Misfires are easily detected by a cylinder pressure history that has a low amplitude and is nearly symmetrical about TDC as shown in FIG. 1.

Similarly, the cylinder pressure history of "late burning" is designated generally by reference numeral 12. Again, those skilled in the art will recognize that "late burning" results when the air/fuel mixture within the cylinder ignites but burns unusually slow or erratically. This abnormal condition is frequently caused by excessive charge dilution and is generally characterized by the cylinder pressure history in FIG. 1 wherein two amplitude peaks are shown.

Figures 1A, 1B:
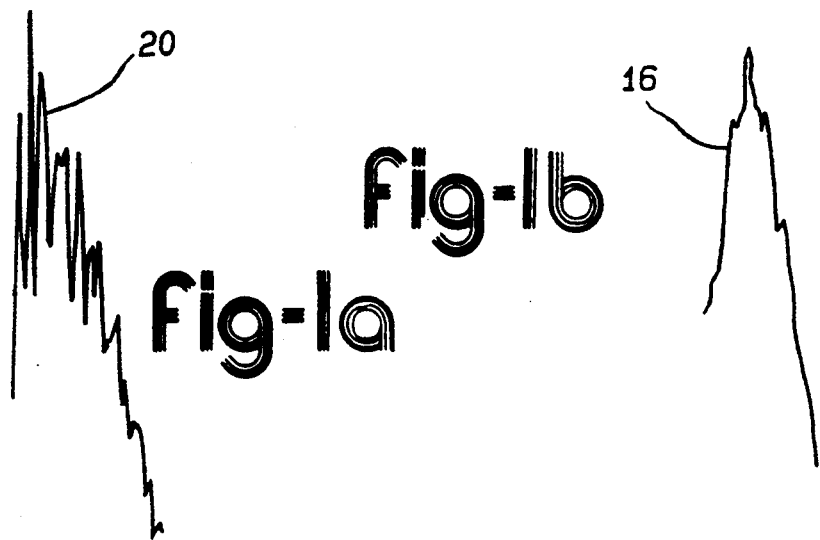

"Normal combustion" as shown in FIG. 1 is generally designated by reference numeral 14. This cylinder pressure history includes spark timing which is at MBT (Minimum Spark Advance For Best Torque) or, equivalently, the spark advance that yields best fuel economy for the particular engine speed and load condition. As seen in the cylinder pressure history of normal combustion 14, there is included a small oscillatory component 16 shown near the peak pressure of normal combustion which indicates the existence of trace levels of knock in the combustion chamber. A magnified view of this oscillatory component is shown in FIG. 1b. Those skilled in the art will recognize that knock or detonation in spark ignited engines is a phenomenon in which combustion chamber end gases (or unburned fuel/air mixture ahead of a flame front) auto-ignites or "explodes." This instantaneous burning and accompanying rapid pressure increase typically excites acoustic pressure oscillations within the combustion chamber. These oscillations, in turn, generate vibrations in the engine structure on the order of 3 kilohertz and above, which ultimately may produce audible sounds of "pinging."

Because excessive knock can be detrimental to both engine performance and life, historic research and development has been directed to means of detecting knock and knock intensity and controlling the causative factors which give rise to this phenomenon. For example, combustion temperatures and pressures may be reduced by retarding spark timing or reducing engine load. If not properly addressed, excessive knock, in its most destructive form, increases heat transfer to the cylinder walls, cylinder head and piston top and produces premature surface ignition (or pre-ignition) of the combustible mixture before spark firing. A sample combustion pressure history of pre-ignition is designated generally by reference numeral 18 in FIG. 1. Like the combustion pressure history of normal combustion, the pre-ignition history 18 also includes an oscillatory component designated generally be reference numeral 20. As readily seen and expected, oscillations 20 are more frequent and several orders of magnitude larger than oscillations 16. A magnified view of this oscillatory component is provided in FIG. 1a.

In internal combustion engines, excessive knock normally precedes engine damaging pre-ignition. This is not true, however, in the case of alternative fuels, such as methanol which may experience surface ignition with little or no evidence of detonation. It is therefore highly desirable to determine commercially feasible methods of detecting knock borderline and implementing corrective procedures to obviate engine damage.

Figure 2:
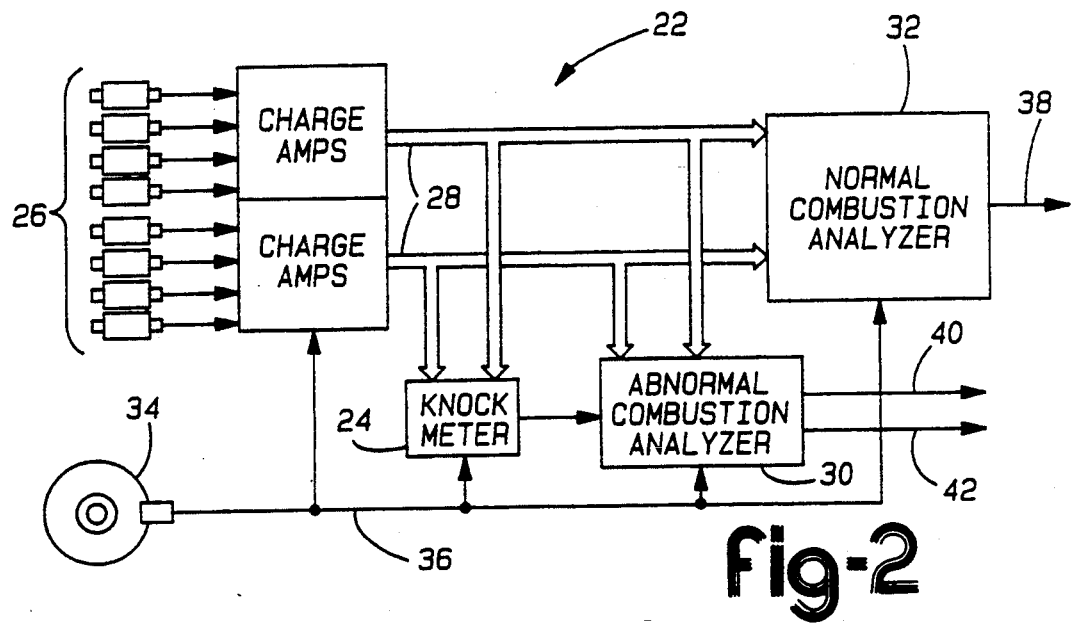
FIG. 2 is a block diagram of a knock control system incorporating the method and apparatus of the present invention.

With reference now to FIG. 2, there is provided a block diagram of a knock control system utilizing the apparatus of the present invention. As shown in FIG. 2, the control system is generally designated by reference numeral 22 and includes knock meter 24 which is the focus of the present invention. As seen, combustion pressure sensors or transducers 26 are utilized to detect combustion pressure fluctuations in the internal combustion engine cylinder (not shown) and generate a plurality of pressure signals 28 for receipt by knock meter 24, abnormal combustion analyzer 30, and normal combustion analyzer 32. There is further shown a crankshaft position encoder 34 for sensing engine cycle phasing and generating an information signal 36 corresponding thereto for receipt by knock meter 24, abnormal combustion analyzer 30, and normal combustion analyzer 32. As shown, in the event that normal combustion is determined, an additional information signal 38 is provided to the data acquisition system. Yet, in the event abnormal combustion is detected, information signals 40 and 42 are provided to the fuel injectors (pre-ignition) and to the ignition system (borderline knock).

Figure 3:
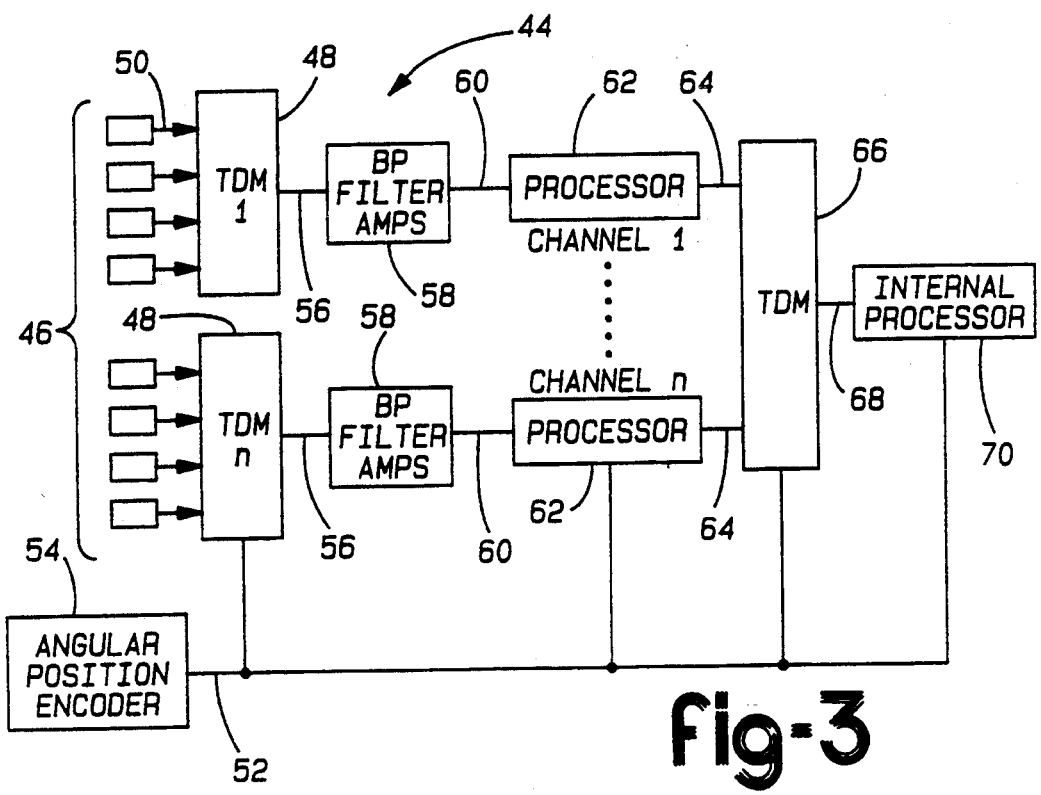
FIG. 3 is a general system block diagram of the apparatus of the present invention.

Referring now to FIG. 3, a system block diagram of the present invention is shown and designated generally by reference numeral 44. System 44 includes a plurality of vibration sensors or in-cylinder combustion pressure sensors 46. As referenced above, typical vibration sensors have generally proven inappropriate for use in knock control systems. However, improvements in their design are ongoing and they are therefore recognized by applicants as potentially useful in accordance with the present invention. For purposes of the following analysis, however, in-cylinder pressure sensors such as, for example, a Kistler #6123 Piezoelectric Quartz sensor element will be assumed to be used and implemented. As seen in FIG. 3, sensors 46 are provided in electrical contact with primary time division multiplexed (TDM) channel means 48 for receiving pressure signals 50 and an information signal 52 generated by engine sensing means 54 to generate at least one time division multiplexed (TDM) signal 56. As seen, engine sensing means 54, in the preferred embodiment comprises an angular position encoder which analyzes crankshaft position input to provide information regarding engine cycle phasing.

Still referring to FIG. 3, filter means 58 is provided in electrical contact with primary TDM channel means 48 for receiving the TDM signal output, attenuating selected undesired frequency components and amplifying selected desired frequency components to produce a plurality of bandpass filtered signals 60. There is further provided first processing means 62 in electrical contact with filter means 58 and engine sensing means 54 for receiving the plurality of bandpass filtered signals 60 and information signal 52. First processing means 62 is designed to determine the amplitude of bandpass filtered signals 60 in absolute value and process the same over selected intervals of engine cycle phasing so as to produce a plurality of window interval processed output signals 64. During processing, bandpass filtered signals 60 may be differentiated, peak detected or integrated over a continuously variable or fixed-length interval of engine crankshaft position or time to achieve the desired window interval processed output signals 64.

There is further provided secondary TDM channel means 66 in electrical contact with first processing means 62 and engine sensing means 54 for receiving and recombining the window interval processed output signals 64 to produce a plurality of time division multiplexed (TDM) output signals 68. These TDM output signals are understood to correspond in real-time to the knock level values of each and every combustion event of the internal combustion engine for which the control procedures have been implemented.

Finally, there is provided second processing means 70 in electrical contact with secondary TDM channel means 66 and engine sensing means 54 for statistically evaluating a collection of knock level values in accordance with a selected probability density function to determine selected statistical values thereof. Second processing means 70 further detects shifts in the determined statistical values and self-normalizes the determined statistical values to compensate for shifting resulting from changes in engine operating conditions.

Figure 4:
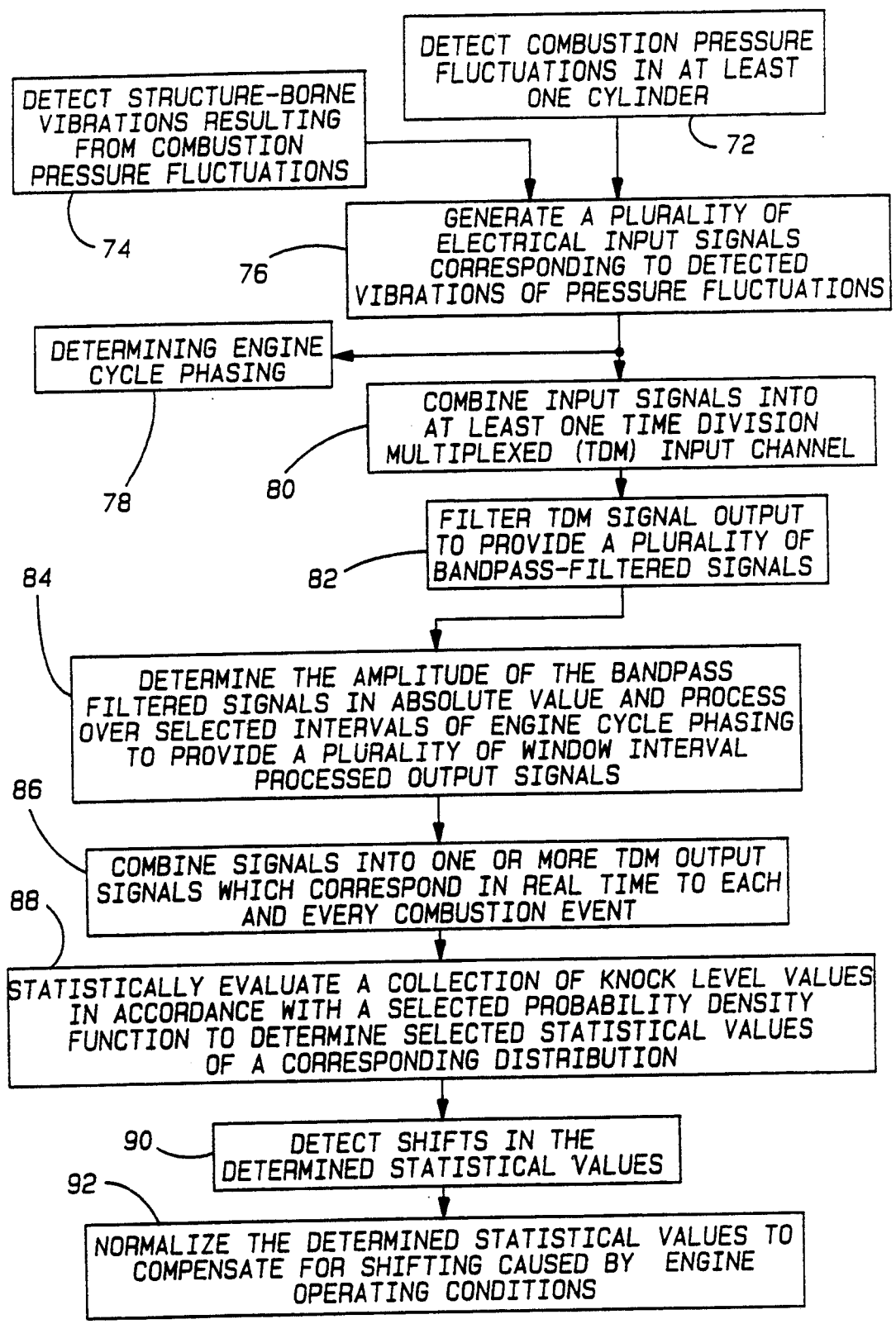
FIG. 4 is a block diagram of the method steps of the present invention.

With reference now to FIG. 4 of the drawings, the method steps of the present invention will now be described in further detail.

As designated by reference numeral 72, the method of detecting knock borderline and evaluating knock intensity of the present invention includes the initial step of detecting combustion pressure fluctuations in at least one cylinder of the internal combustion engine. As referenced above, alternatively, structure-borne vibrations resulting from such combustion pressure fluctuations may be detected as shown in block 74. Regardless, a plurality of electrical input signals corresponding to the detected vibrations or pressure fluctuations are generated for receipt by a channel means such as time division multiplexed (TDM) channel means designated by reference numeral 48 in FIG. 3 and block 76 of FIG. 4.

Following determination of engine cycle phasing, block 78, the generated input signals are combined into at least one time division multiplexed (TDM) input channel in accordance with the determined engine cycle phasing as indicated in block 80. The TDM signal output is then filtered to selectively attenuate undesired frequency components and amplify selected desired frequency components so as to produce a plurality of bandpass filtered signals as shown in block 82.

One or more of the resultant bandpass filtered signals are then frequency discriminated or amplitude modulation (AM) detected by means of the appropriate number of precision full-wave rectification stages, producing TDM route-mean-square energy, or preferably, absolute value direct current or voltage signals. These signals are then differentiated, peak-detected, or integrated over a continuously variable or fixed-length interval of engine crankshaft position or time as indicated in block 84 to produce a plurality of window interval processed output signals. These window interval processed signals are then re-combined as is necessary or desirable in multi-channel implementations, into one or more TDM output signals, block 86. Attention is directed to the fact that these one or more sequential output signal level (knock level) channels are representative of each and every engine combustion event, and are subsequently presented, preferably in real-time, to the self-normalizing statistical processor.

As shown in blocks 88, 90 and 92, the statistical processor accepts as input a collection of, or in the preferred implementation, a continuous sequence of knock level values corresponding to a one-two-one sequence of individual cylinder combustion events. A statistical evaluation is performed on the input values to characterize them in accordance with a selected probability density function to determine selected statistical values of a corresponding distribution In the preferred embodiment, this evaluation will include, at a minimum, determination of the numerical average (mean) and standard deviation (SD) of the knock level for each individual cylinder or, preferably, on an overall engine basis. This evaluation will yield, for example, a Gaussian distribution of the type shown in FIG. 5 and described in more detail below. The preferred implementation will then determine the coefficient of variation (COV) to self-normalize the result for changes in engine operating conditions in accordance with the equation:

$$COV = SD/MEAN.$$

It should be noted that a threshold of COV indicative of the onset of engine knock, or knock borderline condition, may be selected, the criteria for which is described in more detail below. The preferred implementations may also calculate a proportional intensity of knock value based upon other engine factors and operating conditions and this value may be determined using combinations of statistical and other operating parameters, for example, COV, engine speed, quadrilles, etc.

Applicants further recognize that in the preferred implementation, the method of the present invention will permit self-calibration for production and aging variations in engine or electronic hardware. The invention will further permit self-normalization with engine operating conditions. Still further, the invention will permit wide dynamic range of sensor input with operation at variability greater than 100 to 1 with high signal-to-noise ratio, in excess of 80 dB.

STATISTICAL CHARACTERIZATION

Figure 5:
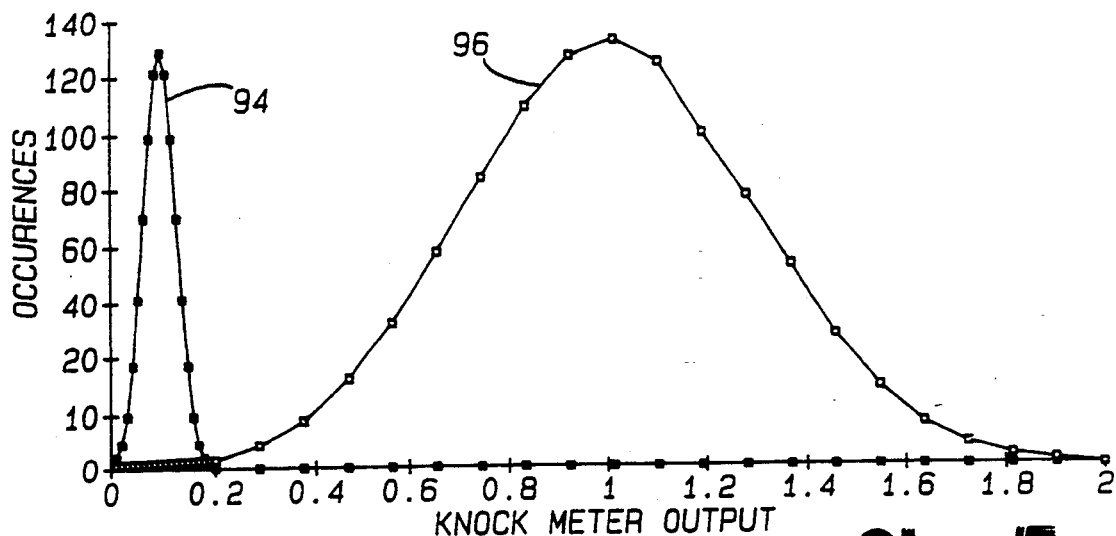
FIG. 5 is a graph diagram of sample knock data taken from a collection of knocking and non-knocking combustion events shown characterized in a Gaussian distribution.
Figure 6:
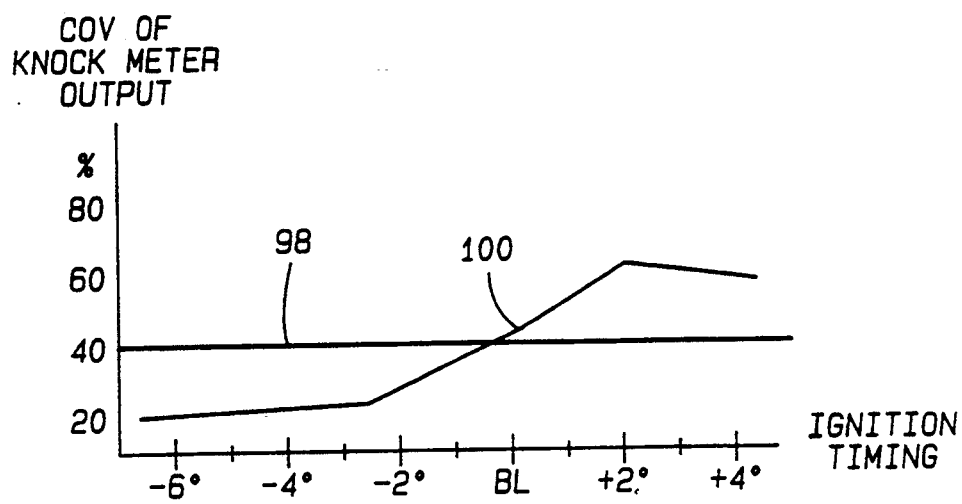
FIG. 6 is a graph diagram of the typical bline or threshold value for the coefficient of variation of knock meter output (knock COV) for the Gaussian distribution of FIG. 5.

With reference now to FIGS. 5–6 of the drawings, the statistical characterization of the present invention will now be described in further detail.

At the outset, it should be understood that applicants' approach assumes that all knocking or non-knocking combustion events may be characterized from sampling selected values of a knock level population in accordance with a selected probability density function to yield known and repeatable statistical description, for example, a Gaussian distribution. A further assumption is that knocking and non-knocking cycles come from two separate and distinct populations as indicated in FIG. 5 which illustrates the probability density function of non-knocking cycles designated generally by reference numeral 94 as well as the probability density function of knocking cycles indicated generally by reference numeral 96.

Based on the foregoing assumptions, a sample of cycles which are mixed between the two populations may be indicated by a change from the expected distribution characteristic. For example, the Gaussian assumption would place the standard deviation of a pure non-knocking knock level signal at ⅓ of its mean value for 99.7% of the expected occurrences. The same would be expected of a pure knocking signal. Thus, samples of both populations would have expected COV (coefficient of variation) values of 33% or less with 99.7% probability.

A larger threshold value of COV, for example 50%, might be used to indicate distorted or skewed Gaussian characteristics indicative of a mixture of samples from each of the two, knocking and non-knocking, cycle populations. A parameter such as COV may be used to self-normalize the measurement, compensating for mean value shifts due to changes in engine operating conditions. It should be recognized, however, that in similar fashion, shifts from other expected statistical values of other distributions (poisson, binomial, etc.) may also be used, substituting similar statistical descriptors for these expected distributions. Detection of the above described statistical shifts, regardless of the type of distribution, may be used for determining the onset of knock, also known as the knock borderline, engine operating condition.

As shown in FIG. 6, bline is the threshold value (Y-axis point) for coefficient of variation of knock meter output (knock COV). When the knock COV exceeds this threshold, borderline knock has been detected. Knock COV has been computed as the standard deviation of knock meter output divided by its mean value for the same sample set and is therefore unitless but typically expressed as a percentage. As shown in FIG. 6, bline which is indicated generally by reference numeral 98 is typically 40% for a sample set size wherein COV is 100. In FIG. 6, the point at which knock is detectable is graphically indicated by reference numeral 100.

While the best mode for carrying out the invention has been described in detail, those familiar with the art to which this invention relates will recognize various alternative designs and embodiments for practicing the invention as defined by the following claims.

We claim:

1. A method of detecting knock borderline and evaluating knock intensity in an internal combustion engine having at least one cylinder, comprising the steps of:

detecting combustion pressure fluctuations in said at least one cylinder;

generating a plurality of electrical input signals corresponding to said detected pressure fluctuations;

determining engine cycle phasing;

combining said input signals into at least one time-division multiplexed (TDM) input channel in accordance with said determined engine cycle phasing;

filtering said at least one TDM channel over a selected bandwidth to attenuate undesired frequency components and amplify desired frequency components therein so as to produce a plurality of bandpass filtered signals;

determining the amplitude of said bandpass filtered signals in absolute value;

processing said determined amplitude values over selected intervals of engine cycle phasing to produce a plurality of window interval processed output signals;

recombining said output signals into at least one time-division multiplexed (TDM) knock level channel to produce a plurality of TDM output signals, said TDM output signals corresponding in real time to the knock level values of each and every combustion event;

statistically evaluating a continuous sequence of said knock level values corresponding to a one-to-one sequence of individual cylinder combustion events to determine the numerical average (MEAN) and standard deviation (SD) of the knock level for said engine;

determining the coefficient of variation (COV) of knock level in accordance with the formula COV=SD/MEAN; and normalizing said determined MEAN and SD values in real time to compensate for statistical shifts due to changes in engine operating conditions.

2. The method of claim 1, wherein said processing step includes the step of integrating said determined amplitude values over a continuously variable interval of engine cycle phasing.

3. The method of claim 1, wherein said processing step includes the step of integrating said determined amplitude values over a fixed-length interval of engine cycle phasing.

4. The method of claim 1, wherein said processing step includes the step of differentiating said determined amplitude values over a continuously variable interval of engine cycle phasing.

5. The method of claim 1, wherein said processing step includes the step of differentiating said determined amplitude values over a fixed-length interval of engine cycle phasing.

6. A method of detecting knock borderline and evaluating knock intensity in an internal combustion engine having at least one cylinder, comprising the steps of:

detecting structure borne vibrations resulting from combustion pressure fluctuations in said at least one cylinder;

generating a plurality of electrical input signals corresponding to said detected vibrations;

determining engine cycle phasing;

combining said input signals into at least one time-division multiplexed (TDM) input channel in accordance with said determined engine cycle phasing;

filtering said at least one TDM channel over a selected bandwidth to attenuate undesired frequency components and amplify desired frequency components therein so as to produce a plurality of bandpass filtered signals;

determining the amplitude of said bandpass filtered signals in absolute value;

processing said determined amplitude values over selected intervals of engine cycle phasing to produce a plurality of window interval processed output signals;

recombining said output signals into a time-division multiplexed (TDM) knock level channel to produce a plurality of TDM output signals, said TDM output signals corresponding in real time to the knock level values of each and every combustion event;

evaluating a collection of said knock level values in accordance with a selected probability density function to determine selected statistical values of a corresponding statistical distribution;

detecting shifts in said determined statistical values; and normalizing said determined statistical values to compensate for shifting caused by changes in engine operating conditions.

7. A method of detecting knock borderline and evaluating knock intensity in an internal combustion engine having at least one cylinder, comprising the steps of:

detecting combustion pressure fluctuations in said at least one cylinder;

generating a plurality of electrical input signals corresponding to said detected pressure fluctuations;

determining engine cycle phasing;

combining said input signals into at least one time-division multiplexed (TDM) input channel in accordance with said determined engine cycle phasing;

filtering said at least one TDM channel over a selected bandwidth to attenuate undesired frequency components and amplify desired frequency components therein so as to produce a plurality of bandpass filtered signals;

determining the amplitude of said bandpass filtered signals in absolute value;

processing said determined amplitude values over selected intervals of engine cycle phasing to produce a plurality of window interval processed output signals;

recombining said output signals into a time-division multiplexed (TDM) knock level channel to produce a plurality of TDM output signals, said TDM output signals corresponding in real time to the knock level values of each and every combustion event;

evaluating a collection of said knock level values in accordance with a selected probability density function to determine selected statistical values of a corresponding statistical distribution;

detecting shifts in said determined statistical values; and normalizing said determined statistical values to compensate for shifting caused by changes in engine operating conditions.

8. The method of claim 7, wherein said selected statistical values include the numerical average (MEAN) and standard deviation (SD) of the knock level for said engine.

9. The method of claim 7, wherein the step of detecting shifts in said determined statistical values includes determining the coefficient of variation (COV) of the knock level for said engine.

10. The method of claim 7, wherein said statistical distribution is Gaussian.

11. The method of claim 7, wherein said statistical distribution is Poisson.

12. The method of claim 7, wherein said statistical distribution is Binomial.

13. The method of claim 7, wherein said processing step includes the step of integrating said determined amplitude values over a continuously variable interval of engine cycle phasing.

14. The method of claim 7, wherein said processing step includes the step of integrating said determined amplitude values over a fixed-length interval of engine cycle phasing.

15. The method of claim 7, wherein said processing step includes the step of differentiating said determined amplitude values over a continuously variable interval of engine cycle phasing.

16. The method of claim 7, wherein said processing step includes the step of differentiating said determined amplitude values over a fixed-length interval of engine cycle phasing.

17. The method of claim 7, wherein the step of evaluating said collection of knock level values includes evaluation of a continuous sequence of said determined knock level values corresponding to a one-to-one sequence of individual cylinder combustion events.

18. Apparatus for detecting knock borderline and evaluating the intensity of knock in an internal combustion engine having at least one cylinder, comprising:

vibration detection means for detecting structure borne vibrations resulting from combustion pressure fluctuations in said at least one cylinder and generating vibration signals corresponding thereto;

engine sensing means for determining engine cycle phasing and generating an information signal corresponding thereto;

first channel means in electrical contact with said vibration detection means and said engine sensing means for receiving said vibration signals and said information signal and generating at least one time division multiplexed (TDM) signal corresponding thereto;

filter means in electrical contact with said first channel means for receiving said at least one TDM signal, attenuating selected undesired frequency components and amplifying selected desired frequency components to produce a plurality of bandpass filtered signals;

first processing means in electrical contact with said filter means for receiving said plurality of bandpass filtered signals, determining the amplitude thereof in absolute value and processing said determined absolute values over selected intervals of engine cycle phasing to produce a plurality of window interval processed output signals;

second channel means in electrical contact with said first processing means and said engine sensing means for receiving and recombining said output signals so as to produce a plurality of time division multiplexed (TDM) output signals, said TDM output signals corresponding in real time to the knock level values of each and every combustion event of said engine; and second processing means in electrical contact with said second channel means and said engine sensing means for statistically evaluating a collection of said knock level values in accordance with a selected probability density function to determine selected statistical values, detect shifts in said determined statistical values and normalize said statistical values to compensate for shifting resulting from changes in engine operating conditions.

19. Apparatus for detecting knock borderline and evaluating the intensity of knock in an internal combustion engine having at least one cylinder, comprising:

pressure sensing means for detecting combustion pressure fluctuations in said at least one cylinder and generating a plurality of pressure signals corresponding thereto;

engine sensing means for determining engine cycle phasing and generating an information signal corresponding thereto;

first channel means in electrical contact with said pressure sensing means and said engine sensing means for receiving said pressure signals and said information signal and generating at least one time division multiplexed (TDM) signal corresponding thereto;

filter means in electrical contact with said first channel means for receiving said at least one TDM signal, attenuating selected undesired frequency components and amplifying selected desired frequency components to produce a plurality of bandpass filtered signals;

first processing means in electrical contact with said filter means for receiving said plurality of bandpass filtered signals, determining the amplitude thereof in absolute value and processing said determined absolute values over selected intervals of engine cycle phasing to produce a plurality of window interval processed output signals;

second channel means in electrical contact with said first processing means and said engine sensing means for receiving and recombining said output signals so as to produce a plurality of time division multiplexed (TDM) output signals, said TDM output signals corresponding in real time to the knock level values of each and every combustion event of said engine; and second processing means in electrical contact with said second channel means and said engine sensing means for statistically evaluating a collection of said knock level values in accordance with a selected probability density function to determine selected statistical values, detect shifts in said determined statistical values and normalize said statistical values to compensate for shifting resulting from changes in engine operating conditions.

20. An apparatus as in claim 19, wherein said collection of knock level values is a continuous sequence of said determined knock level values corresponding to a one-to-one sequence of individual cylinder combustion events.

* * * * *